(12) United States Patent
Kakizaki et al.

(10) Patent No.: US 7,717,598 B2
(45) Date of Patent: May 18, 2010

(54) LIGHT GUIDE, LIGHT SOURCE APPARATUS, AND ELECTRONIC APPARATUS

(75) Inventors: Akinori Kakizaki, Saitama (JP);
Takayoshi Shimomura, Saitama (JP);
Yoshinori Yamazaki, Saitama (JP)

(73) Assignee: Sony Corporation, Tokyo (JP)

( * ) Notice: Subject to any disclaimer, the term of this patent is extended or adjusted under 35 U.S.C. 154(b) by 115 days.

(21) Appl. No.: 11/937,806

(22) Filed: Nov. 9, 2007

(65) Prior Publication Data

US 2008/0112166 A1 May 15, 2008

(30) Foreign Application Priority Data

Nov. 10, 2006 (JP) ............................. 2006-304679

(51) Int. Cl.
*F21V 8/00* (2006.01)

(52) U.S. Cl. ................... 362/551; 362/558; 362/244; 362/249.14; 250/227.11

(58) Field of Classification Search ............... 362/610, 362/628, 551, 555, 235, 249.01, 249.02, 362/26, 27, 237, 244, 249.06, 249.14, 558; 385/32, 146; 250/227.11
See application file for complete search history.

(56) References Cited

U.S. PATENT DOCUMENTS

| | | | | |
|---|---|---|---|---|
| 5,810,463 A | * | 9/1998 | Kawahara et al. | 362/601 |
| 6,417,508 B1 | * | 7/2002 | Ogura et al. | 250/227.2 |
| 6,455,834 B2 | * | 9/2002 | Fujimoto et al. | 250/208.1 |
| 6,565,248 B2 | * | 5/2003 | Honguh et al. | 362/560 |
| 7,338,193 B1 | * | 3/2008 | Zeiger et al. | 362/551 |
| 7,438,452 B2 | * | 10/2008 | Nawashiro | 362/490 |
| 7,503,666 B2 | * | 3/2009 | Tamura | 362/26 |

FOREIGN PATENT DOCUMENTS

| | | |
|---|---|---|
| JP | 2004-072152 | 3/2004 |
| JP | 2006-287923 | 10/2006 |

\* cited by examiner

*Primary Examiner*—Thomas M Sember
(74) *Attorney, Agent, or Firm*—Sonnenschein Nath & Rosenthal LLP

(57) ABSTRACT

A light guide is disclosed. The light guide includes an incident surface, an exit surface, and a light guide section. Light emitted from a plurality of light emitting devices disposed in line enters from the incident surface. The exit surface is formed in a shape causing light to be concentrated. The light which has entered from the incident surface exits from the exit surface. The light guide section is bent. The volume of the light guide gradually increases in a direction from the incident surface to the exit surface.

7 Claims, 13 Drawing Sheets

LIGHT GUIDE, LIGHT SOURCE APPARATUS, AND ELECTRONIC APPARATUS

CROSS REFERENCES TO RELATED APPLICATIONS

The present invention contains subject matter related to Japanese Patent Application JP 2006-304679 filed in the Japanese Patent Office on Nov. 10, 2006, the entire contents of which being incorporated herein by reference.

BACKGROUND OF THE INVENTION

1. Field of the Invention

The present invention relates to a light guide that guides light emitted from a light emitting device and causes the light to linearly exit. The present invention also relates to a light source apparatus and an electronic apparatus that use the light guide.

2. Description of the Related Art

As a light source used for a scanner, a multi-function machine, and so forth that read an image and so forth, a CCFL (Cold Cathode Fluorescent Lighting) lamp has been used. In recent years, to thin or miniaturize the main body of an apparatus, a CIS (Contact Image Sensor) has been used in an image reading section (as disclosed in for example paragraph "0026", FIG. 1, Japanese Patent Application Laid-Open No. 2004-72152). The CIS has an LED (Light Emitting Diode) as a light source to miniaturize the apparatus. The use of the LED instead of the CCFL allows the startup time and the power consumption to decrease. In addition, since the LED is mercury free, it can contribute to prevention of environmental contamination.

SUMMARY OF THE INVENTION

When a solid state light emitting device such as an LED is used as a light source, it appears that a light guide that homogeneously guides light of the light emitting device to a reading object is used. In this case, it is practical that the light guide is linearly structured. As a light source apparatus including the linearly structured light guide is moved, light can be radiated to the entire reading object.

In this case, when light of the light emitting device enters from one end side or both end sides of the light guide, it would be difficult to cause light homogeneously exit from the light guide to the reading object and provide a sufficient amount of light to the reading object. When many light emitting devices are used to increase the amount of light, the apparatus would become large. In addition, light would be inhomogeneously radiated to the reading object.

In view of the foregoing, it would be desirable to provide a light source apparatus which is capable of homogeneously radiating light, a light guide used in the light source apparatus, and an electronic apparatus equipped with the light source apparatus.

In addition, it would be desirable to miniature or thin an electronic apparatus such as a scanner.

According to an embodiment of the present invention, there is provided a light guide. The light guide includes an incident surface, an exit surface, and a light guide section. Light emitted from a plurality of light emitting devices disposed in line enters from the incident surface. The exit surface is formed in a shape causing light to be concentrated. The light which has entered from the incident surface exits from the exit surface. The light guide section is bent. The volume of the light guide gradually increases in a direction from the incident surface to the exit surface.

According to this embodiment of the present invention, since the volume of the light guide section gradually increases, it can effectively guide light that enters from the incident surface and diffuses, condense the light, and cause the condensed light to exit from the exit surface. When the light guide section is bent at a proper angle, light that enters from the incident surface is bent at the desired angle and the light exits from the exit surface. As a result, while the optical path length is kept as large as possible, the light can be diffused and homogeneously radiated. In addition, the light guide and the electronic apparatus equipped therewith can be miniaturized or thinned.

"The light guide section is bent" may refer to the state of which the light guide section is bent with a clear bending line. Instead, "the light guide section is bent" may refer to the state of which the light guide section is gradually bent without a bending line.

In an embodiment of the present invention, the exit surface is blast-finished. As a result, while light is condensed and scattered on the exit surface, the light exits from the exit surface. Thus, light is more homogeneously radiated to the radiating object than the plane that is not blast-finished.

In an embodiment of the present invention, the light guide section is disposed on a far side of a radiating object and has a side surface which is bent at an angle in a range from 120° to 150°. When the side surface is bent in the range, leakage of light from the side surface can be suppressed. As a result, the amount of light that exits from the exit surface can be increased.

In an embodiment of the present invention, the exit surface has a plurality of light condensing surfaces in a direction of which the plurality of light emitting devices are disposed. As a result, the plurality of light condensing surfaces contribute to homogenization of light that exits from the exit surface.

In an embodiment of the present invention, the light incident surface is formed in a shape which causes light to diffuse. As a result, incident light that enters from the incident surface is effectively diffused. This structure contributes to homogenization of light.

According to an embodiment of the present invention, there is provided a light guide. The light guide includes an incident surface, an exit surface, and a light guide section. Light emitted from a plurality of light emitting devices disposed in line enters from the incident surface. The exit surface is formed in a shape causing light to be concentrated. The light which has entered from the incident surface exits from the exit surface to a light radiating object. The light guide section has a first side surface disposed on a near side of the light radiating object and a second side surface disposed on a far side of the light radiating object and bent from the first side surface at a first angle and guides the light from the incident surface to the exit surface.

According to this embodiment, since the second side surface is formed such that it is bent at the first angle, the optical path length can be kept as large as possible. As a result, light that enters from the incident surface can be homogenized. In addition, since the light that enters from the incident surface and is bent at the predetermined angle exits from the exit surface, the light guide and the electronic apparatus can be miniaturized. In addition, light can be caused to be condensed and to exit from the exit surface. As a result, linear light can be caused to effectively exit.

In an embodiment of the present invention, the first side surface has a first reflection surface connected to the incident surface, and a second reflection surface connected to the first reflection surface at a second angle which is smaller than the first angle and to the exit surface. When the light condensing state of the exit surface, the first angle, and the second angle are properly set, light that travels to the exit surface properly spreads. As a result, the line can be substantially collimated on the exit surface formed in the light condensing shape. Thus, well-shaped light, namely accurately liner shaped light, can be radiated.

In an embodiment of the present invention, the second side surface has a third reflection surface which is connected to the incident surface and which is gradually apart from the first reflection surface as the third reflection surface is apart from the incident surface. As a result, light that enters from the incident surface can be guided without a loss of the amount of light.

In an embodiment of the present invention, the light guide section has a shutter section which blocks part of light passing from the incident surface to the exit surface and which is formed between the first reflection surface and the second reflection surface such that the shutter section is recessed from the first side surface. As a result, excessive light that tends to spread and that exits from the end region of the exit surface can be caused to exit from the center region of the exit surface.

According to an embodiment of the present invention, there is provided a light source apparatus. The light source apparatus includes a plurality of light emitting devices and a light guide. The plurality of light emitting devices is disposed in line. The light guide has an incident surface from which light emitted from the plurality of light emitting devices enters, an exit surface which is formed in a shape causing light to be concentrated and from which the light which has entered from the incident surface exits, and a light guide section which is bent and whose volume gradually increases in a direction from the incident surface to the exit surface.

According to an embodiment of the present invention, there is provided an electronic apparatus. The electronic apparatus includes a plurality of light emitting devices, a light guide, and a photoelectric converting device. The plurality of light emitting devices is disposed in line. The light guide has an incident surface from which light emitted from the plurality of light emitting devices enters, an exit surface which is formed in a shape causing light to be concentrated and from which the light which has entered from the incident surface exits, and a light guide section which is bent and whose volume gradually increases in a direction from the incident surface to the exit surface. The photoelectric converting device receives the light which has exited from the exit surface and has reflected by a light radiating object and converts the reflected light into an electric signal.

Thus, according to embodiments of the present invention, light can be homogeneously radiated to the radiating object. In addition, the light guide, the light source apparatus, and the electronic apparatus can be miniaturized or thinned.

These and other objects, features and advantages of the present invention will become more apparent in light of the following detailed description of a best mode embodiment thereof, as illustrated in the accompanying drawings.

BRIEF DESCRIPTION OF DRAWINGS

The invention will become more fully understood from the following detailed description, taken in conjunction with the accompanying drawings, wherein similar reference numerals denote similar elements, in which.

DESCRIPTION OF PREFERRED EMBODIMENTS

Next, with reference to the accompanying drawings, embodiments of the present invention will be described.

Figure 1:
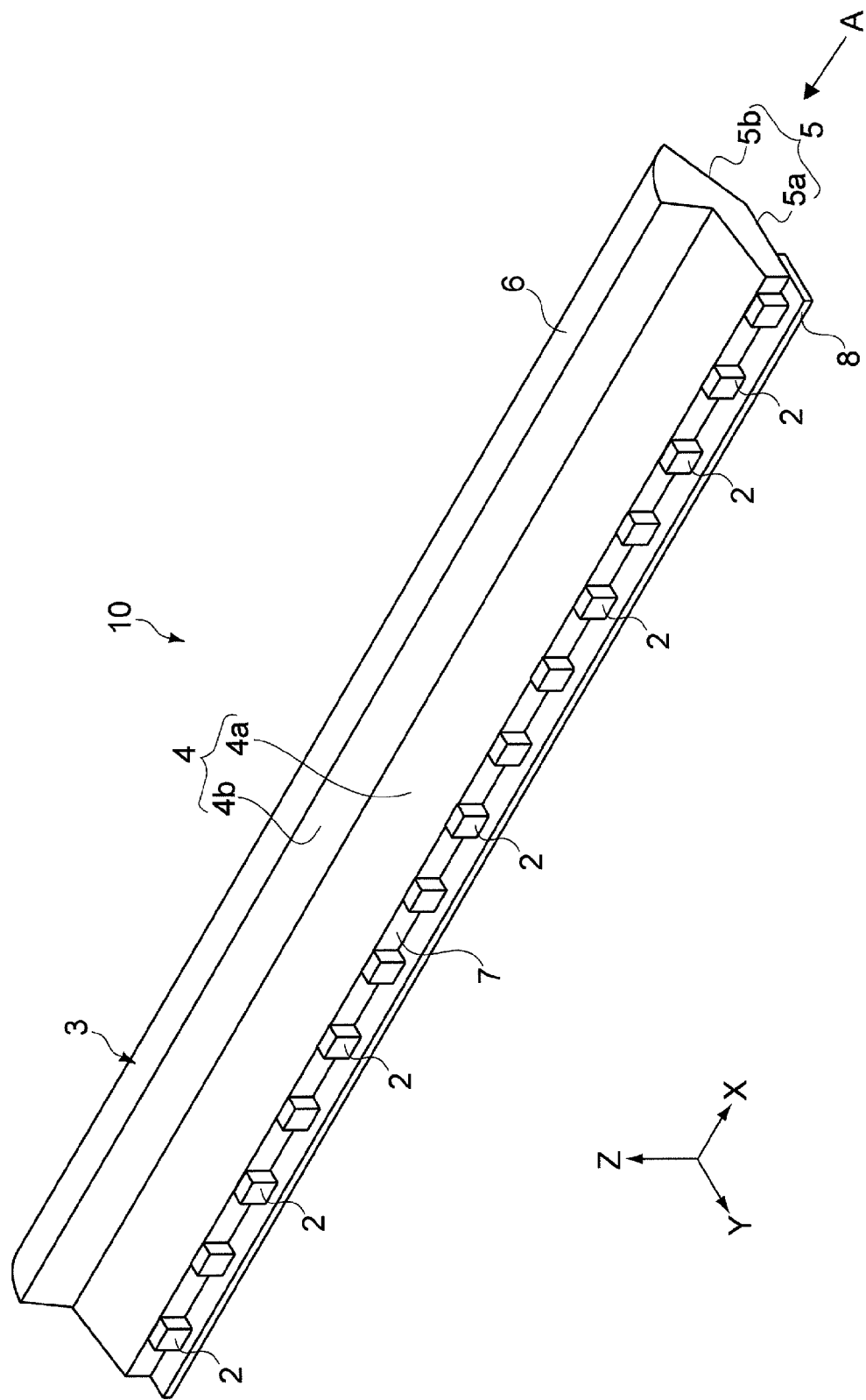
FIG. 1 is a perspective view showing a light source apparatus according to an embodiment of the present invention.
Figure 2:
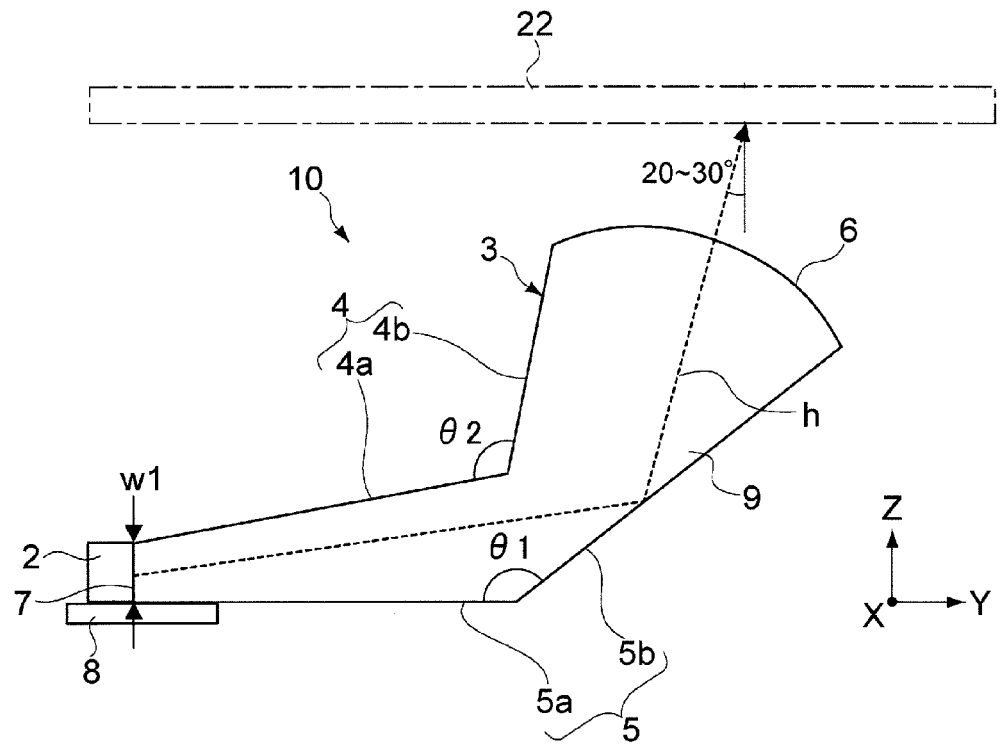
FIG. 2 is a schematic diagram showing the light source apparatus viewed in the direction of arrow A shown in FIG. 1.
Figure 3:
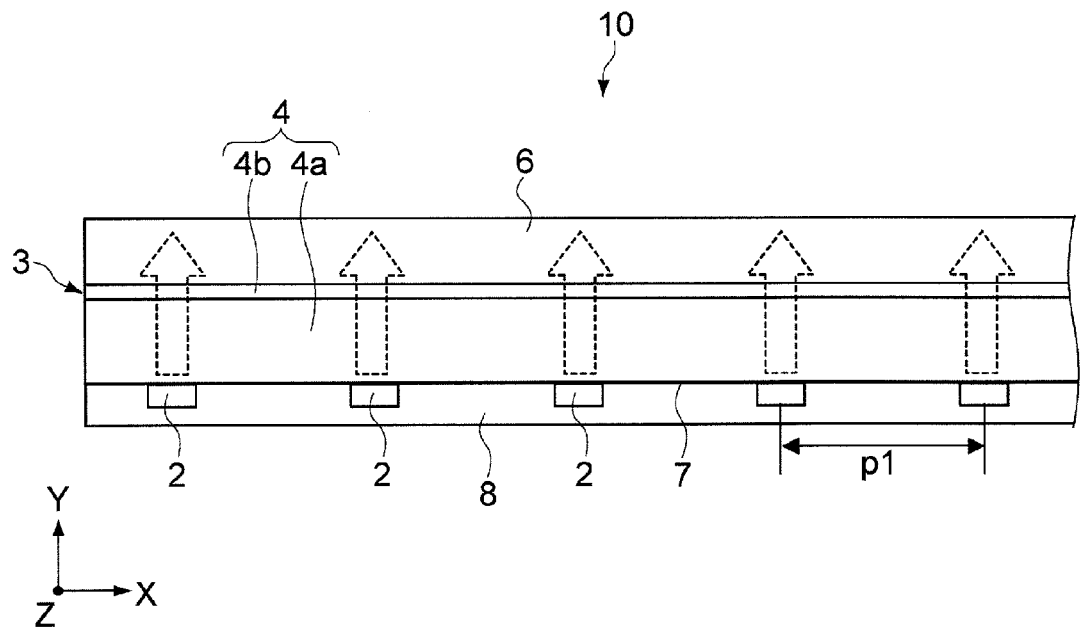
FIG. 3 is a plan view showing a part of the light source apparatus.

FIG. 1 is a perspective view showing a light source apparatus 10 according to an embodiment of the present invention. FIG. 2 is a schematic diagram showing the light source apparatus 10 viewed in the direction of arrow A shown in FIG. 1. FIG. 3 is a plan view showing a part of the light source apparatus 10.

As shown in FIG. 1 and FIG. 3, the light source apparatus 10 includes a plurality of light emitting devices 2 and a light guide 3. The light emitting devices 2 are disposed in line (in the X direction shown in FIG. 1 and FIG. 3). The light guide 3 guides light emitted from the light emitting devices 2 in a predetermined direction. The light emitting devices 2 are disposed, for example, on a printed wiring board 8. Each of the light emitting devices 2 is an LED that has three light emitting sources of red, green, and blue (RGB). The light emitting devices 2 emit white light of which these color lights are mixed.

Instead, each of the light emitting devices 2 may be composed of a light emitting source of a single color or a plurality of light emitting sources of a single color. In these cases, each of the light emitting devices 2 emits light of a single color of RGB. The light guide 3 mixes lights of different colors of RGB. The light emitting devices 2 may be inorganic light emitting devices or organic light emitting devices.

Figure 4:
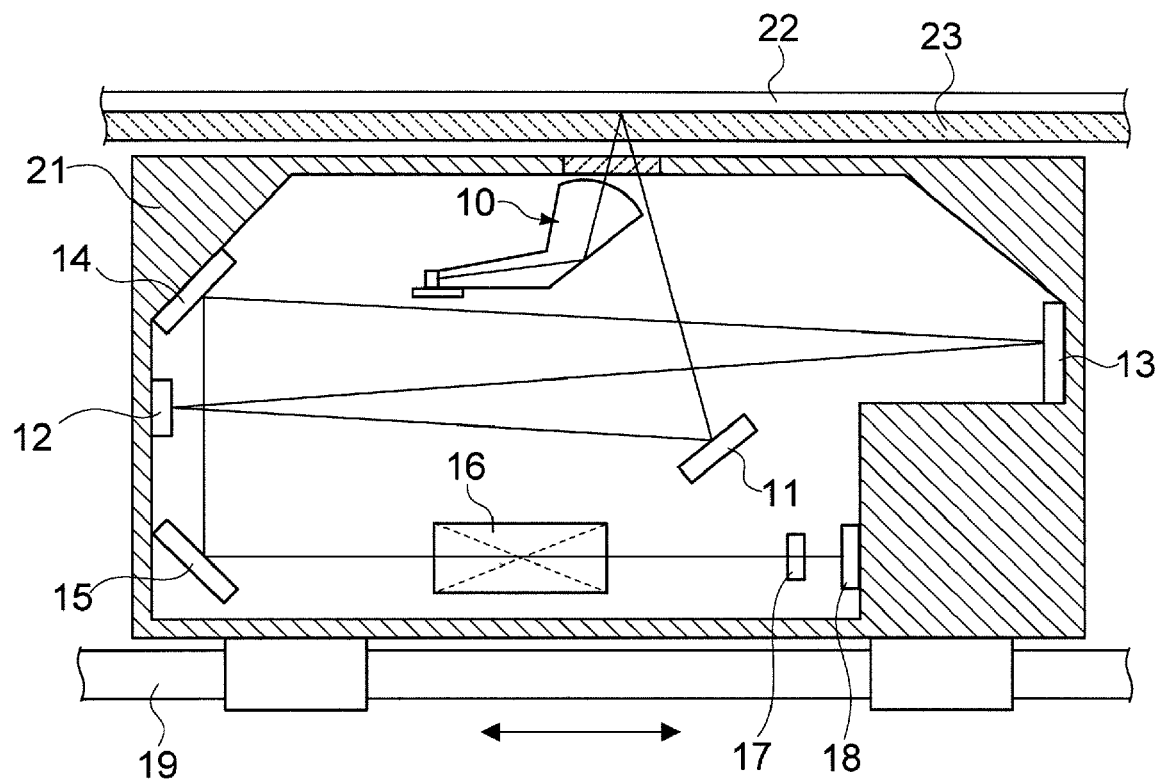
FIG. 4 is a sectional view showing a carriage into which the light source apparatus has been built.
Figure 5:
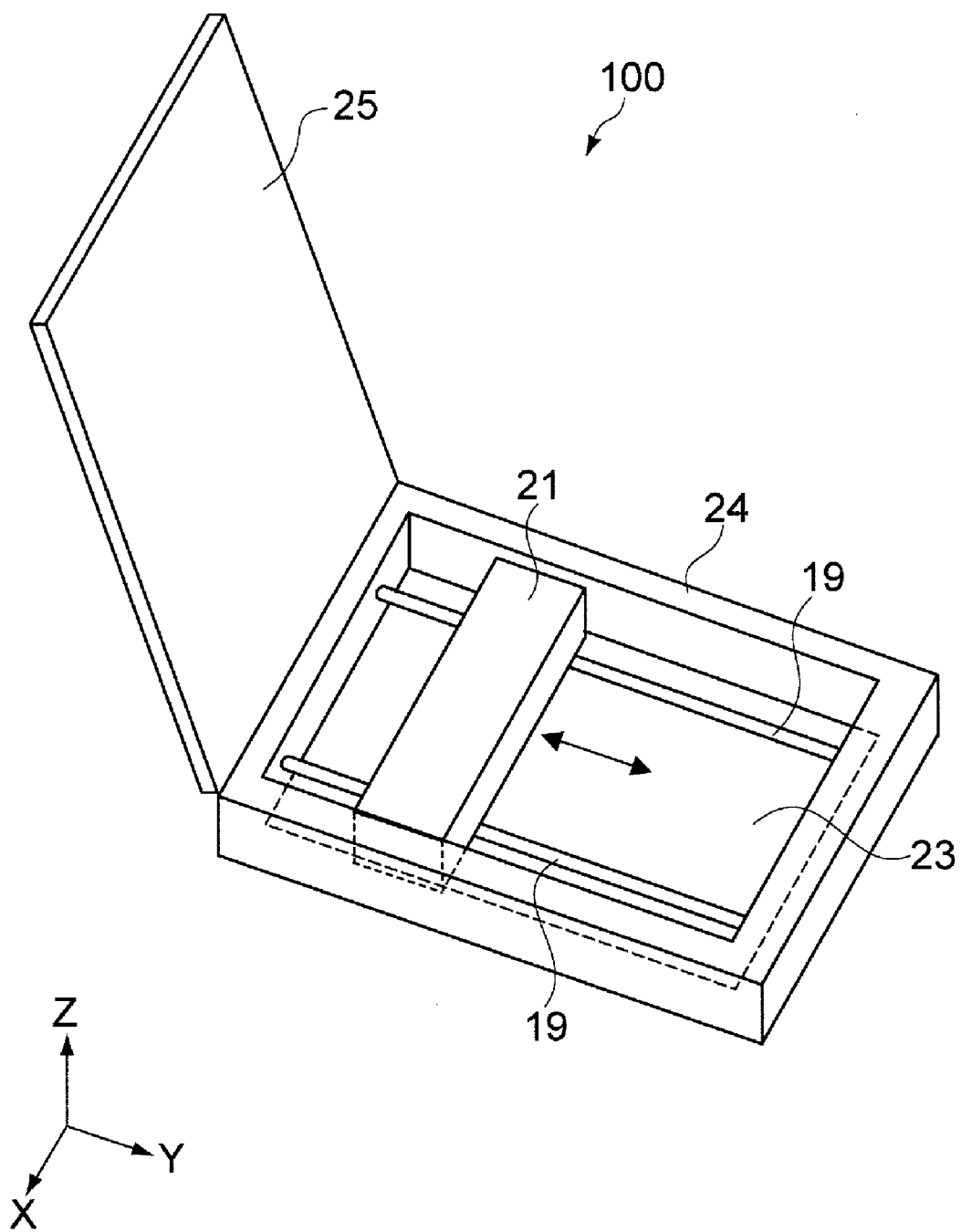
FIG. 5 is a perspective view showing a scanner apparatus as an exemplary electronic apparatus equipped with a carriage.

FIG. 4 is a sectional view showing a carriage into which the light source apparatus 10 shown in FIGS. 1 to 3 has been built. FIG. 5 is a perspective view showing a scanner apparatus as an exemplary electronic apparatus equipped with the carriage 21. The scanner apparatus 100 includes a main body 24 and a cover 25. The main body 24 has a platen 23 on which a sheet of a document, a photo, or the like as an exemplary light radiating object 22 (refer to FIG. 2 and FIG. 4). The cover 25 is disposed on the main body 24 such that the cover 25 can be opened from or closed to the platen 23. The platen 23 is made, for example, of a glass or a resin having a high light transmissivity. Disposed in the main body 24 are a motor (not shown) and so forth that move the carriage 21 in a linear direction (the Y direction shown in FIG. 1 to FIG. 5) such that the entire plane of the light radiating object 22 placed on the platen 23 is read. In addition, disposed in the main body 24 is a guide rail 19 that guides the carriage 21 that moves. The guide rail 19 is connected to a lower portion of the carriage 21, for example, as shown in FIG. 4. The structure of the scanner apparatus 100 is not limited to such an example shown in FIG. 1 to FIG. 5. Thus, the scanner apparatus 100 may be designed to be in any proper structure when necessary.

As shown in FIG. 4, disposed in the carriage 21 are the foregoing light source apparatus 10, a plurality of mirrors 11, 12, 13, 14, and 15, a lens system 16 that focus an object, an optical path length adjustment device 17, and an image sensor (photo-optical converting device) 18. The plurality of mirrors 11, 12, 13, 14, and 15 are disposed such that the optical path length from the light source apparatus 10 to the image sensor 18 becomes as large as possible. The mirrors 11, 12, 13, 14, and 15 elongate in the X direction (shown in FIG. 4). The lens system 16 may be composed of a plurality of lenses. The optical path length adjustment device 17 adjusts the optical path difference, for example, between infrared light and regular light. The image sensor 18 is, for example, a CCD (Charge Coupled Device). The image sensor 18 may be a CMOS (Complementary Metal-Oxide Semiconductor) sensor instead of a CCD. The optical system disposed in the carriage 21 may be designed to be in any proper structure depending on the type of the image sensor 18.

Figure 6:
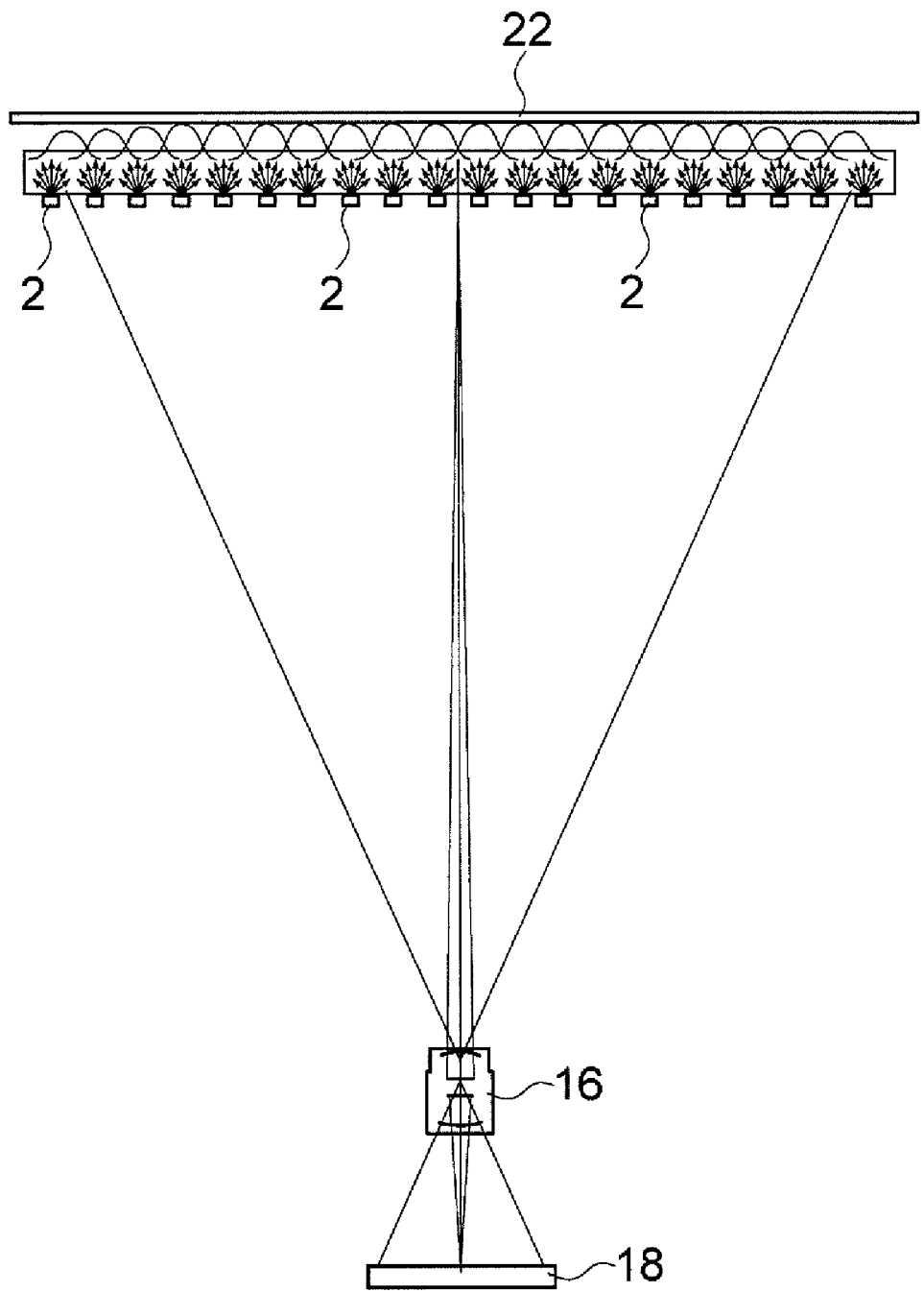
FIG. 6 is a schematic diagram showing a theory of an optical system disposed in the carriage.

FIG. 6 is a schematic diagram showing a theory of the optical system disposed in the carriage 21. Linear light that exits from an exit surface 6 (that will be described later) of the light guide 3 is radiated to the light radiating object 22. The reflected light from the light radiating object 22 is reflected by the mirrors 11, 12, 13, 14, and 15 (refer to FIG. 4). The reflected light of the mirrors 11, 12, 13, 14, and 15 enters the image sensor 18 through the lens system 16.

As shown in FIG. 2, the light guide 3 includes an incident surface 7 from which light emitted from the plurality of light emitting devices 2 enters, the foregoing exit surface 6 that causes light that has entered from the incident surface 7 to be condensed and the condensed light to exit, and a light guide section 9 that guides the light that has entered from the incident surface 7 to the exit surface 6.

The incident surface 7 is, for example, plane-shaped. Width w1 in the Z direction (the width in the height direction) of the incident surface 7 is designed to be substantially the same width as or slightly smaller than the light emitting plane of each of the light emitting devices 2. This structure prevents light that exits from the exit surface 6 from being mixed with dark lines. As a result, this structure contributes to homogenization of light.

The light guide section 9 is bent such that its volume gradually increases in the direction from the incident surface 7 to the exit surface 6. The state of "the light guide section 9 is bent" may be clearly represented by a bending line as shown in FIG. 2. Instead, the state of "the light guide section 9 is bent" may be a curved state without a bending line.

The light guide section 9 has a first side surface 4 that is formed on a near side of the light radiating object 22 and a second side surface 5 that is formed on a far side of the first side surface 4. The first side surface 4 is composed of a first reflection surface 4a and a second reflection surface 4b. The second side surface 5 is composed of a third reflection surface 5a and a fourth reflection surface 5b. The angle formed by the third reflection surface 5a and the fourth reflection surface 5b is represented by angle θ1, whereas the angle formed by the first reflection surface 4a and the second reflection surface 4b is represented by angle θ2. Angle θ1 and angle θ2 satisfy the relationship of θ1>θ2. In other words, this relationship causes the volume of the light guide section 9 to gradually increase in the direction from the incident surface 7 to the exit surface 6. In other words, the light guide section 9 is formed such that the more the first reflection surface 4a is apart from the incident surface 7, the more the first reflection surface 4a is apart from the third reflection surface 5a and that the more the second reflection surface 4b is apart from the incident surface 7, the more the second reflection surface 4b is apart from the fourth reflection surface 5b. In this example, the angles are based on plane X-Y.

In particular, θ1 is set in the range from 120° to 150°. Preferably, θ1 is set to 142°. In contrast, θ2 is not restricted as long as it is smaller than θ1. In other words, θ1 and θ2 are set such that the radius of curvature of the exit surface 6 (that will be described later) becomes proper, namely light having desired light flux and light amount exits from the exit surface 6.

The exit surface 6 has a cylindrical shape section viewed in the direction of the drawing of FIG. 2. Instead, the exit surface 6 may have an elliptical shape section or a hyperbolic curve shape section. The exit surface 6 may be blast-finished. When the exit surface 6 is blast-finished, light that exits from the exit surface 6 can be condensed and scattered on the exit surface 6. As a result, light is more homogeneously radiated to the light radiating object 22 than the exit surface 6 that is not blast-finished. As shown in FIG. 3, when pitch p1 between adjacent light emitting devices 2 is larger than optical path length h represented by dotted lines shown in FIG. 2, it appears that color shading occurs. However, when the exit surface 6 is blast-finished, it promotes to homogenize light. As a result, optical path length h is allowed to be smaller than pitch p1. Thus, the light guide 3 can be thinned or miniaturized. Although p1 is set in the range around from 9 to 12 mm, it may be designed to be any proper value depending on the size of the light emitting devices and other designing conditions. Although the radius of curvature of the exit surface 6 is set in the range around from 2 to 4 mm, it may be designed to be any proper value when necessary.

Figure 7:
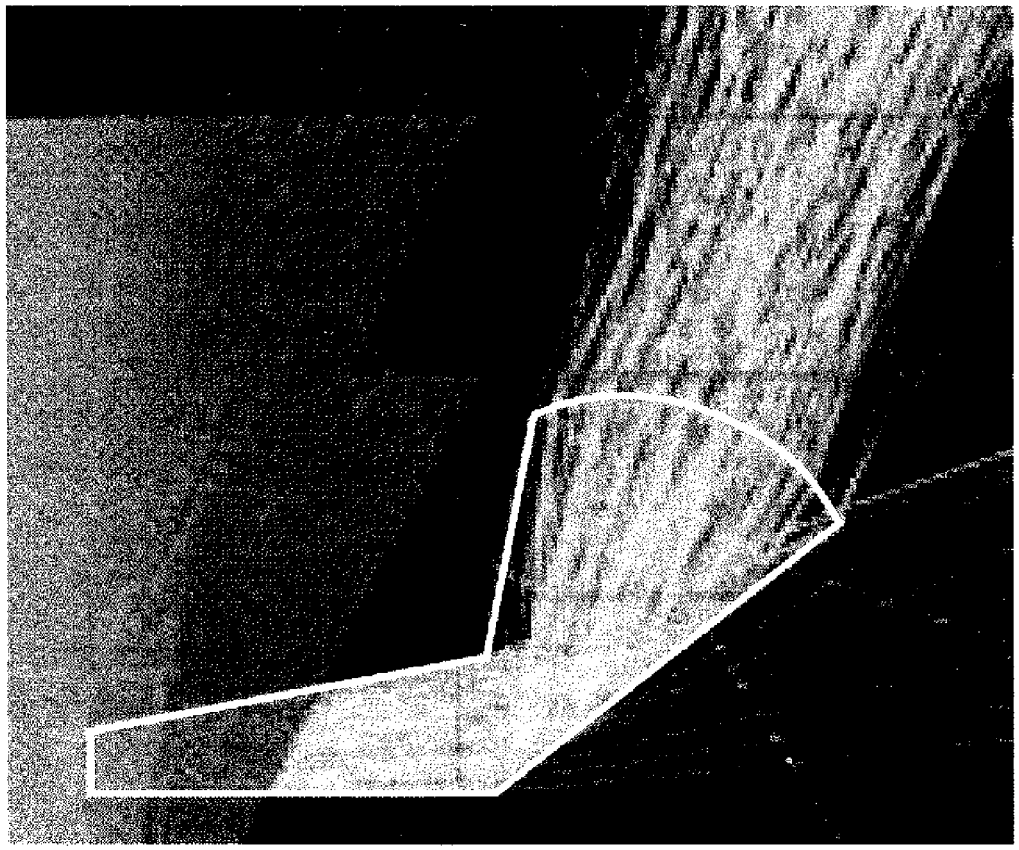
FIG. 7 is a schematic diagram showing a simulation of light beams that pass through a light guide.

FIG. 7 is a schematic diagram showing a simulation of light beams that pass through the light guide 3. As is clear from the drawing, most of light beams that have entered from the incident surface 7 are totally reflected on the first side surface 4 and the second side surface 5 and exit from the exit surface 6. Thus, the amount of light beams that exit from the exit surface 6 increases. When angles θ1 and θ2 are properly set to the foregoing values, such light beams can be achieved.

Depending on the shape of the exit surface 6 and the values of θ1 and θ2, the light guide section 9 properly spreads light that travels toward the exit surface 6. As a result, the exit surface 6 formed in a light condensing shape can substantially collimate light. Thus, well-shaped light, namely accurately liner shaped light, can be radiated.

Figure 8:
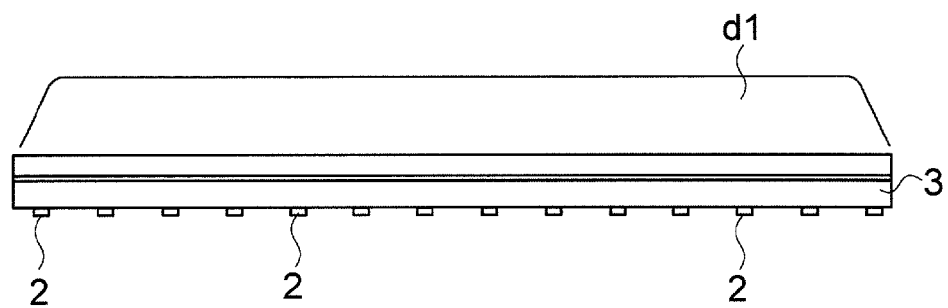
FIG. 8 is a schematic diagram showing an illuminance distribution characteristic of the light source apparatus according to the embodiment of the present invention.

FIG. 8 is a schematic diagram showing an illuminance distribution characteristic of the light source apparatus 10 according to this embodiment of the present invention. In FIG. 8, illuminance distribution d1 is uniform in the longitudinal direction of the light source apparatus 10.

Figure 9:
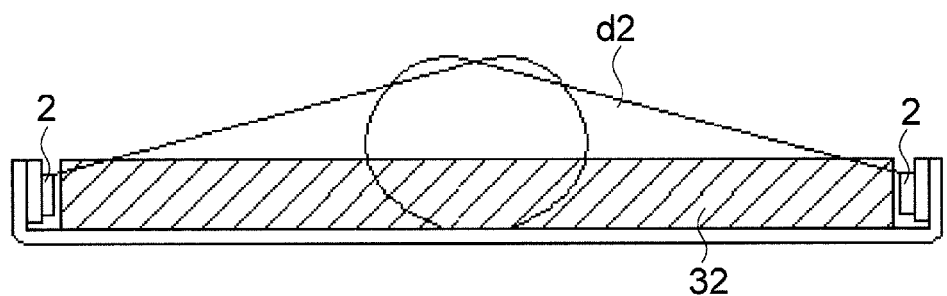
FIG. 9 is a schematic diagram showing an illuminance distribution in the case that light emitting devices are disposed at both ends of a light guide plate.
Figure 10:
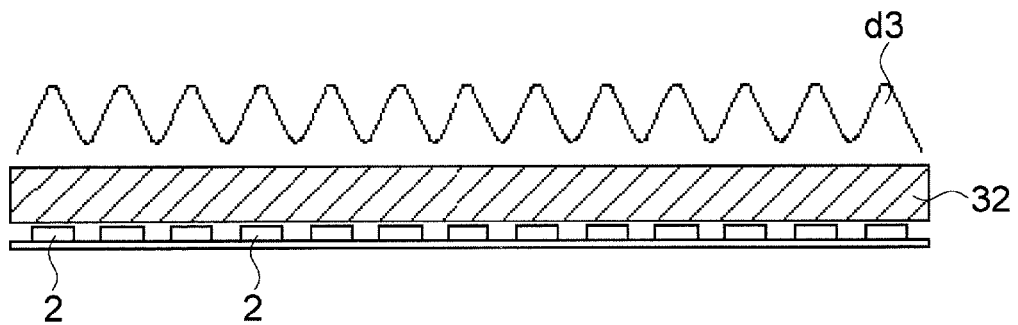
FIG. 10 is a schematic diagram showing an illuminance distribution in the case that a plurality of light emitting devices are disposed immediately below the light guide plate.

FIG. 9 schematically shows an illuminance distribution in the case that the light emitting devices 2 are disposed on both ends of a light guide plate 32. In this example, the illuminance is the strongest at the center of illuminance distribution d2. FIG. 10 is a schematic diagram showing an illuminance distribution in the case that a plurality of light emitting devices 2 are disposed, for example, immediately below the light guide plate 32. In this example, illuminance distribution d3 varies at each of the light emitting devices 2. In the examples shown in FIG. 9 and FIG. 10, it is difficult to obtain a uniform illuminance distribution.

As described above, according to this embodiment, since the light guide section 9 is designed such that its volume gradually increases, the light guide section 9 can effectively guide light that has entered from the incident surface 7 and that has diffused and cause the light to exit from the exit surface 6. In other words, the light guide section 9 can guide light that has entered from the incident surface 7 and that has diffused without a loss of light.

In addition, since the light guide section 9 is bent, light that has entered from the incident surface 7 is bent at a predetermined angle and then the light exits from the exit surface 6. Thus, while optical path length h of the light guide 3 is kept as large as possible, light can be diffused and homogeneously radiated. In addition, the light guide 3 and the scanner apparatus 100 equipped therewith can be miniaturized or thinned. However, as described above, optical path length h can be smaller than pitch p1 (refer to FIG. 3).

According to this embodiment, since it is not necessary to use a diffuser sheet and so forth, the manufacturing costs of the light source apparatus 10 and the scanner apparatus 100 can be reduced. In addition, these omission contributes to miniaturization of the light source apparatus 10 and the scanner apparatus 100.

Figures 11A, 11B:
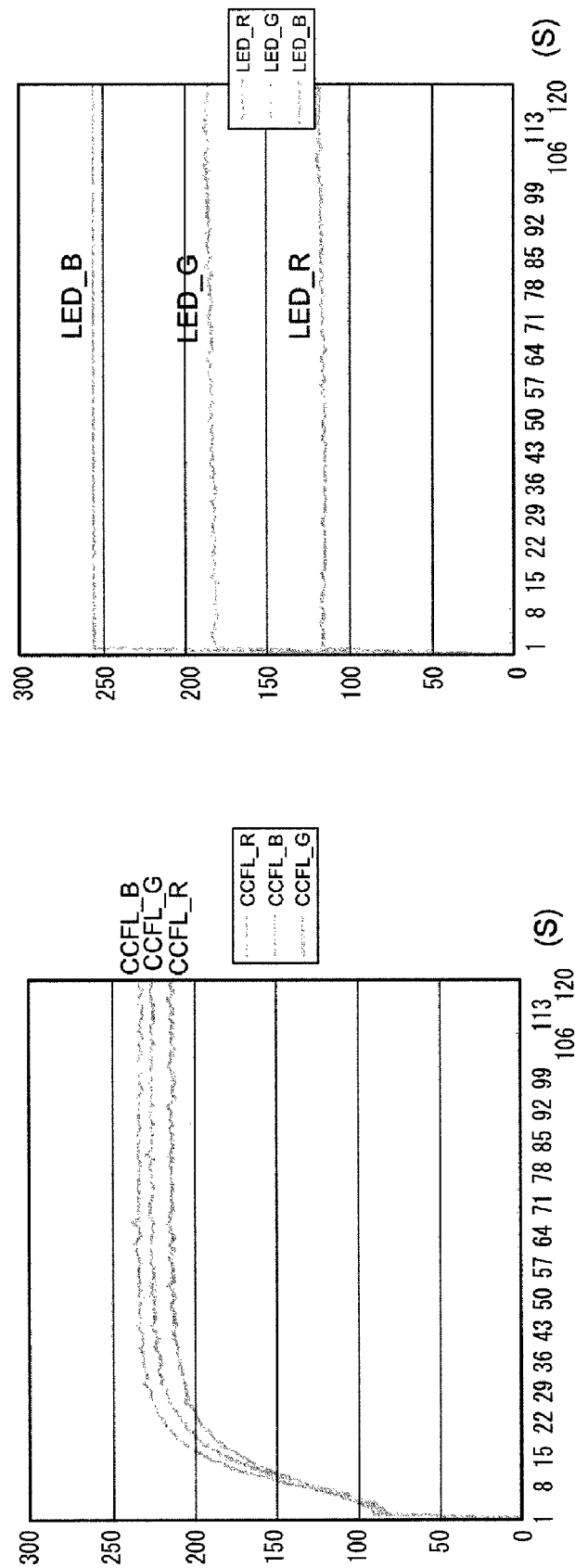
FIG. 11A and FIG. 11B are graphs showing startup times of a CCFL and an LED of the related art.

FIG. 11A and FIG. 11B are graphs showing the startup times of a CCFL and an LED of the related art. The vertical axis of each graph represents the intensity of light, whereas the horizontal axis represents the elapsed time after power-on (unit: seconds). Thus, although the LED has differences of intensities of RGB, the startup time of the LED is much smaller than that of the CCFL.

Figure 12:
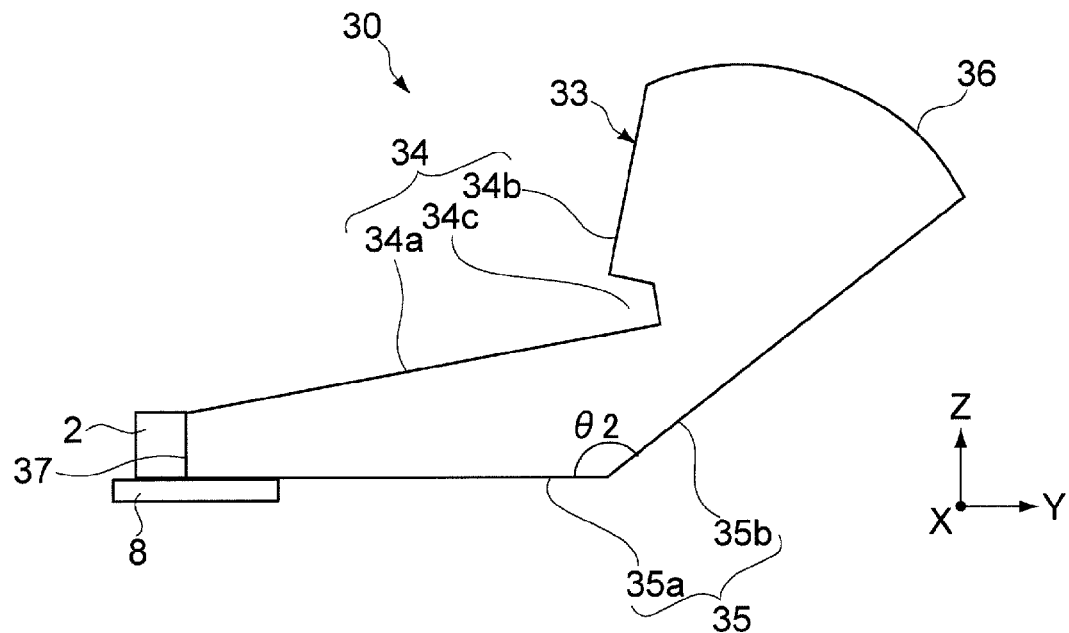
FIG. 12 is a side view showing a light source apparatus according to another embodiment of the present invention.

FIG. 12 is a side view showing a light source apparatus 30 according to another embodiment of the present invention. In the following, the description of structures and functions that are the same as those of the light source apparatus 10 shown in FIG. 2 will be simplified or omitted and only their different points will be described.

Figure 13:
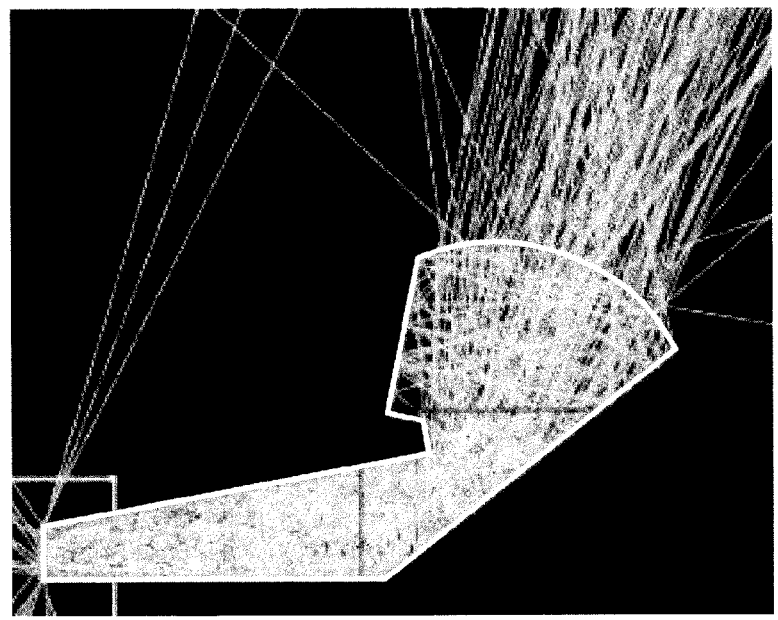
FIG. 13 is a schematic diagram showing a simulation of light beams that pass through a light guide shown in FIG. 12.
Figure 14:
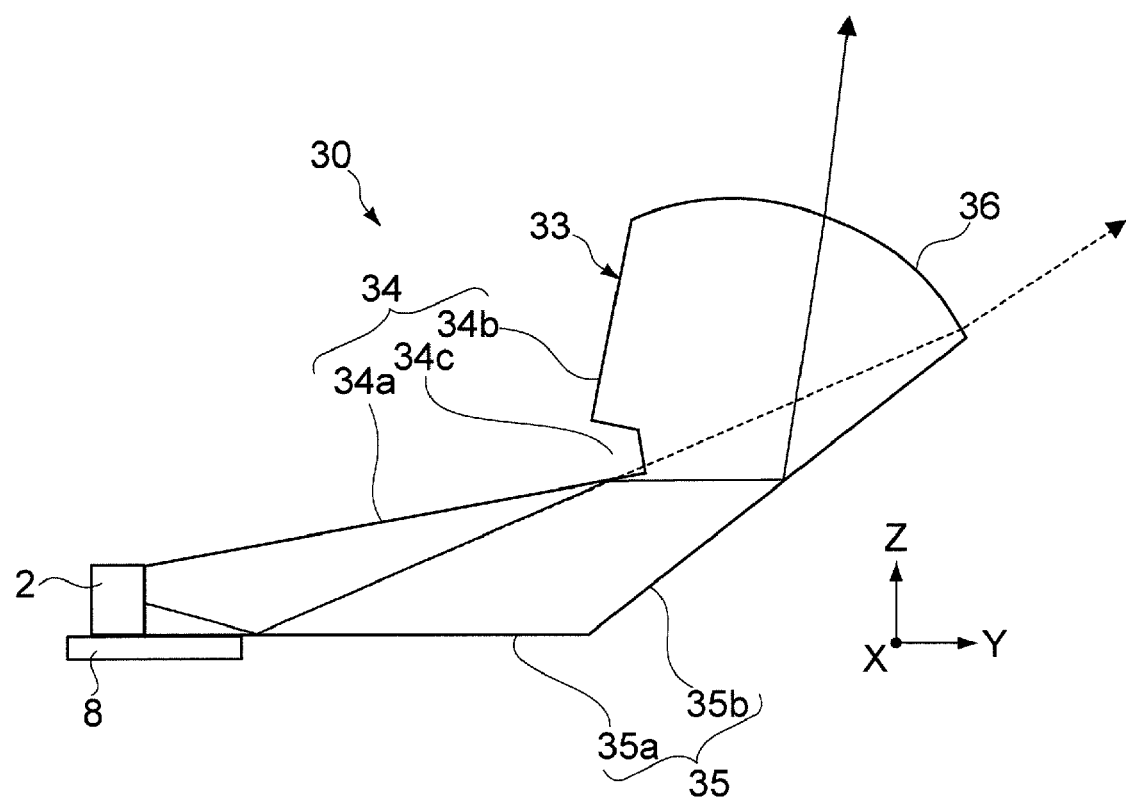
FIG. 14 is a schematic diagram describing a function of a shutter section of the light source apparatus.

In this embodiment, a light guide 33 shown in FIG. 12 has a shutter section 34c that is recessed from a first side surface 34 and that is formed between a first reflection surface 34a and a second reflection surface 34b. The shutter section 34c has a function of blocking part of light beams that travel from an incident surface 37 to an exit surface 36. FIG. 13 is a schematic diagram showing a simulation of light beams that pass through the light guide 33. Although the light guide 33 has the shutter section 34c, the light guide 33 has the same effect as the light guide 3 shown in FIG. 2. Unless the light guide 33 has the shutter section 34c, incident light reflected on a third reflection surface 35a tends to spread and exit from an end region of the exit surface 36 as represented by a dotted line shown in FIG. 14. In contrast, the light guide 33 of this embodiment allows incident light reflected on the third reflection surface 35a to be reflected on the shutter section 34c and the reflected light to exit from a center region instead of the end region of the exit surface 36.

Figure 15A:
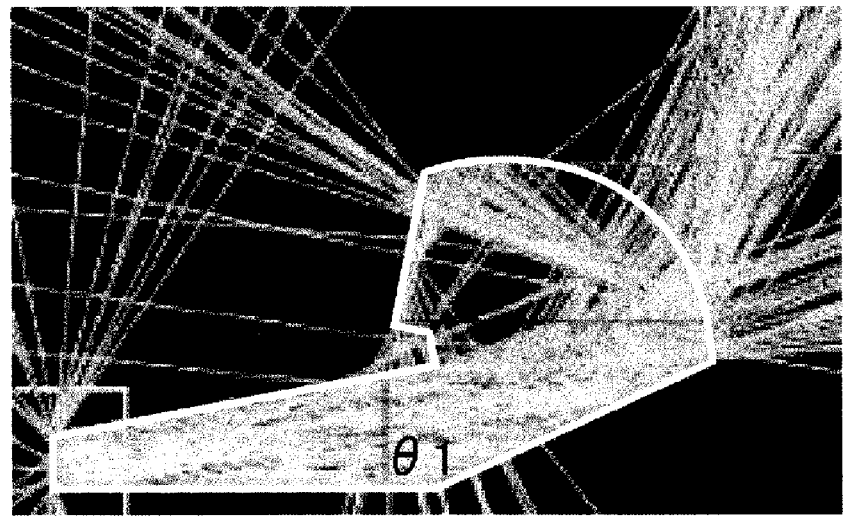
FIG. 15A is a schematic diagram showing a simulation of light beams that pass through the light guide in the case that angle θ2 has been set to larger than 150°.
Figure 15B:
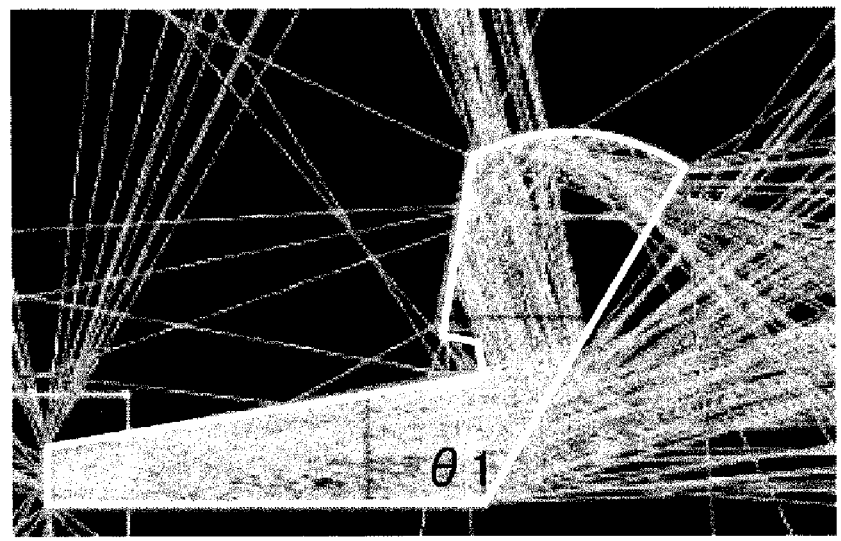
FIG. 15B is a schematic diagram showing a simulation of light beams that pass through the light guide in the case that angle θ2 has been set to smaller than 120°.

FIG. 15A is a schematic diagram showing a simulation of light beams that pass through the light guide 33 that has the shutter section 34c and whose θ1 is set to 150° or more. FIG. 15B is a schematic diagram showing a simulation of light beams that pass through the light guide 33 that has the shutter section 34c and whose θ1 is set to smaller than 120°. Thus, it is clear that light increasingly leaks from the light guide 33 unless angle θ1 is in the range from 120° to 150°.

FIG. 15A and FIG. 15B show simulations of light beams that pass through the light guide 33 having the shutter section 34c. Likewise, unless angle θ1 is in a proper range, light leaks from a light guide that does not have the shutter section 34c.

Figure 16:
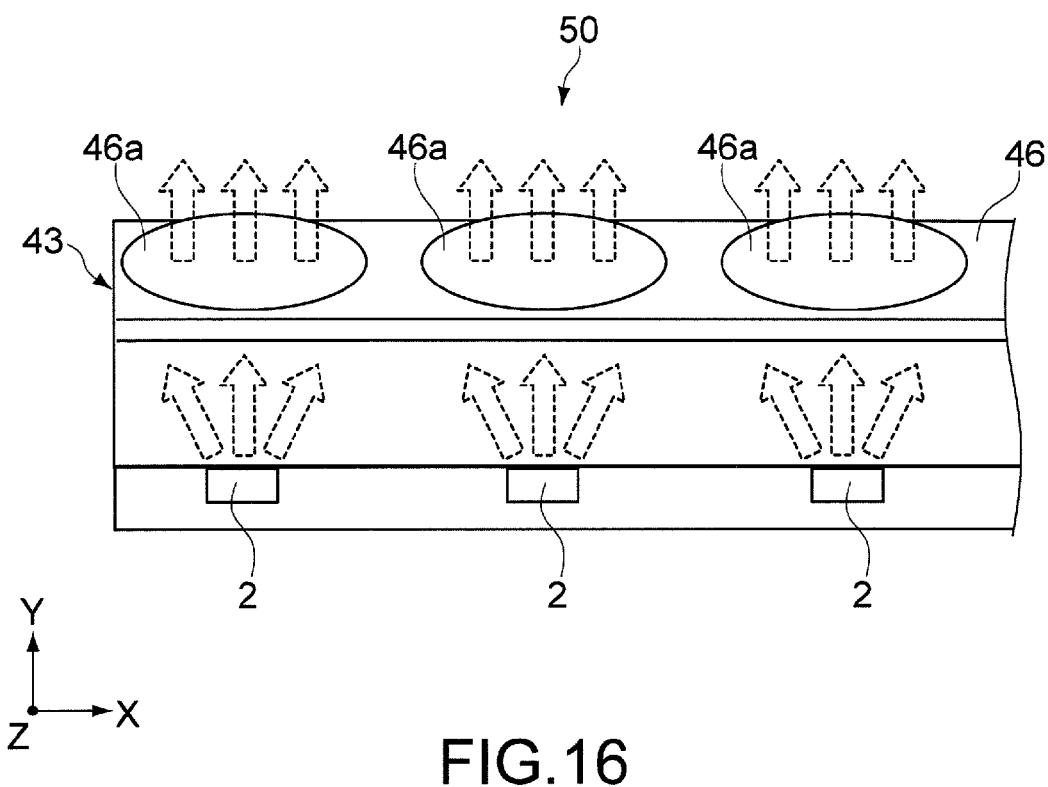
FIG. 16 is a plan view showing a part of a light source apparatus according to another embodiment of the present invention.

FIG. 16 is a plan view showing a part of a light source apparatus according to another embodiment of the present invention. Formed on an exit surface 46 of a light guide 43 of a light source apparatus 50 are a plurality of light condensing planes 46a formed in the direction of which a plurality of light emitting devices 2 are disposed. In this example, the light condensing planes 46a are formed corresponding to the light emitting devices 2 in one-to-one relationship. Instead, the light condensing planes 46a may not be formed corresponding to the light emitting devices 2 in one-to-one relationship. In other words, one light condensing plane 46a may be formed corresponding to every two or more light emitting devices 2. The light condensing planes 46a may have a spherical shape section or a toroidal shape section. When the light guide 43 is viewed from its side, it has the same shape as the light guide 3 shown in FIG. 2 or the light guide 33 shown in FIG. 12.

The plurality of light condensing planes 46a contribute to homogenization of light that exits from the exit surface 46.

Figure 17:
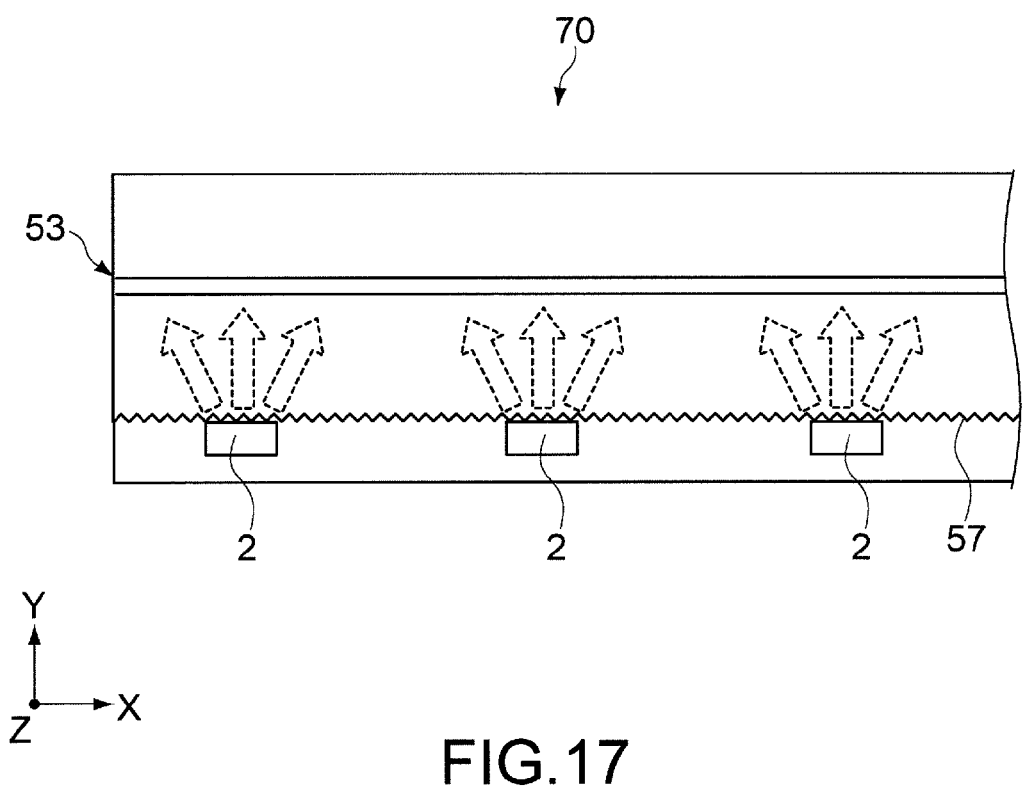
FIG. 17 is a plan view showing a part of a light source apparatus according to another embodiment of the present invention.

FIG. 17 is a plan view showing a part of a light source apparatus 70 according to another embodiment of the present invention. In the light source apparatus 70, a light guide 53 has an incident surface 57 formed in a shape that causes light to diffuse, for example, in a prism shape. Prisms formed on the incident surface 57 may be designed in any proper size. As the diffusing shape other than the prism shape, a concaved plane may be formed on each of the light emitting devices 2. Thus, the light guide 53 can effectively diffuse incident light that enters from an incident surface 57 and contributes to homogenization of the incident light.

Figure 18:
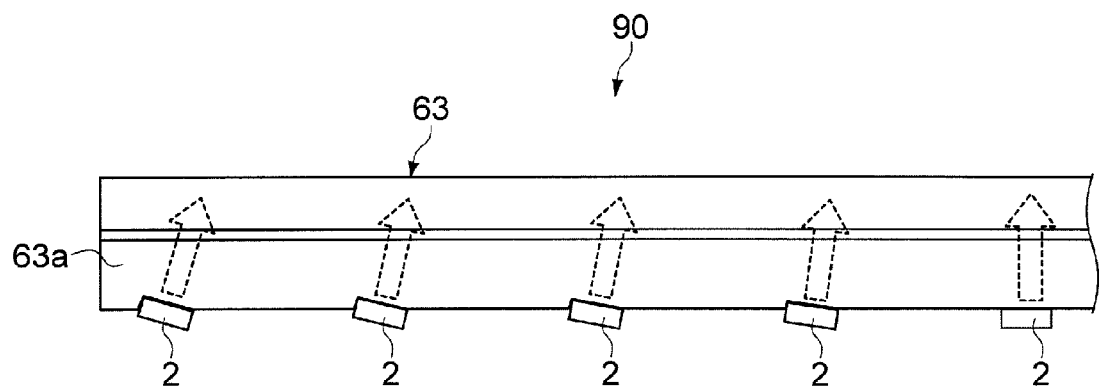
FIG. 18 is a plan view showing a part of a light source apparatus according to another embodiment of the present invention.

FIG. 18 is a plan view showing a part of a light source apparatus 90 according to another embodiment of the present invention. In the light source apparatus 90, light emitting devices 2 are disposed in such a manner that the inclining angle of each of the light emitting devices 2 to the center of a light guide 63 is proportional to the distance from the center of the light guide 63. In other words, the inclination angle of the light emitting devices 2 disposed at an end region 63a is the largest in all the light emitting devices 2. Thus, the illuminance at the end region 63a of the light guide 63 can be prevented from decreasing in comparison with the other structures. As a result, the illuminance at the end region 63a can be uniformly kept in comparison with the other structures.

Figures 19A, 19B:
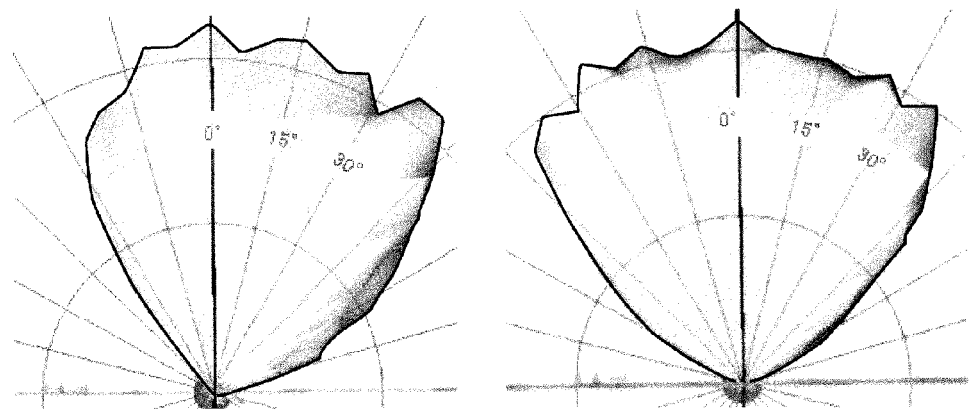
FIG. 19A is a schematic diagram showing an illuminance distribution of a left half of the light source apparatus shown in FIG. 18.
FIG. 19B is a schematic diagram showing an illuminance distribution of the light source apparatus shown in FIG. 3.

FIG. 19A is a schematic diagram showing an illuminance distribution of a left half of the light source apparatus 90 shown in FIG. 18. The illuminance distribution of the right half of the light source apparatus 90 is symmetrical to that of its left half. Thus, it is clear that light does not largely spread to the left and right. FIG. 19B is a schematic diagram showing an illuminance distribution of the light source apparatus 10 shown in FIG. 3.

It should be understood by those skilled in the art that various modifications, combinations, sub-combinations and alternations may occur depending on design requirements and other factors insofar as they are within the scope of the appended claims or the equivalents thereof.

For example, at least two of the light source apparatuses 10, 30, 50, 70, and 90 may be used in combinations.

In the foregoing embodiments, the scanner apparatus 100 was described as an exemplary electronic apparatus. Instead, the electronic apparatus may be a copy machine or a multi-function machine incorporated with a printer function.

In the foregoing embodiments, the light emitting devices were disposed in one row. Instead, the light emitting devices may be disposed in a plurality of rows.

What is claimed is:

1. A light guide, comprising:
an incident surface from which light emitted from a plurality of light emitting devices disposed in line enters;
an exit surface which is formed in a shape causing light to be concentrated and from which the light which has entered from the incident surface exits; and
a light guide section which is bent and whose volume gradually increases in a direction from the incident surface to the exit surface,
wherein,
the exit surface has a plurality of light condensing surface corresponding to the plurality of light emitting devices.

2. The light guide as set forth in claim 1, wherein the exit surface is blast-finished.

3. The light guide as set forth in claim 1, wherein the light guide section has a side surface which is disposed on a far side of a radiating object and which is bent at an angle in a range from 120° to 150°.

4. The light guide as set forth in claim 1, wherein the light incident surface is formed in a shape which causes light to diffuse.

5. A light guide comprising:
an incident surface from which light emitted from a plurality of light emitting devices disposed in line enters;
an exit surface which is formed in a shape causing light to be concentrated and from which the light which has entered from the incident surface exits to a light radiating object; and
a light guide section which has a first side surface disposed on a near side of the light radiating object and a second side surface disposed on a far side of the light radiating object and bent from the first side surface at a first angle and which guides the light from the incident surface to the exit surface,
wherein,
the first side surface has (1) a first reflection surface connected to the incident surface and (2) a second reflection surface connected to the first reflection surface at a second angle which is smaller than the first angle and to the exit surface, and
the light guide section has a shutter section which blocks part of light passing from the incident surface to the exit surface and which is formed between the first reflection surface and the second reflection surface such that the shutter section is recessed from the first side surface.

6. A light source apparatus, comprising:
a plurality of light emitting devices disposed in line;
a light guide having an incident surface from which light emitted from the plurality of light emitting devices enters;
an exit surface which is formed in a shape causing light to be concentrated and from which the light which has entered from the incident surface exits; and
a light guide section which is bent and whose volume gradually increases in a direction from the incident surface to the exit surface,
wherein,
the exit surface has a plurality of light condensing surfaces corresponding to the light emitting devices.

7. An electronic apparatus, comprising:
a plurality of light emitting devices disposed in line;
a light guide having an incident surface from which light emitted from the plurality of light emitting devices enters;
an exit surface which is formed in a shape causing light to be concentrated and from which the light which has entered from the incident surface exits;
a light guide section which is bent and whose volume gradually increases in a direction from the incident surface to the exit surface; and
a photoelectric converting device which receives the light which has exited from the exit surface and has reflected by a light radiating object, and converts the reflected light into an electric signal,
wherein,
the exit surface has a plurality of light condensing surfaces corresponding to the light emitting devices.

* * * * *